Oct. 7, 1969   R. H. GOEBEL   3,471,688
PIEZOELECTRIC ANALOG MULTIPLIER
Filed Feb. 11, 1965
FIG. 1.
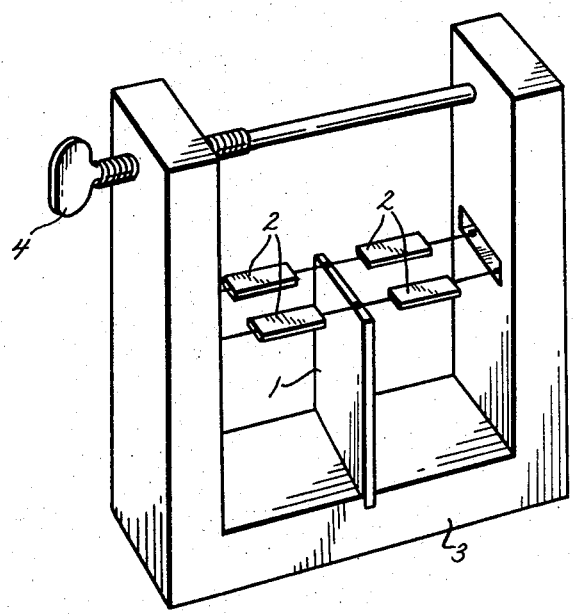
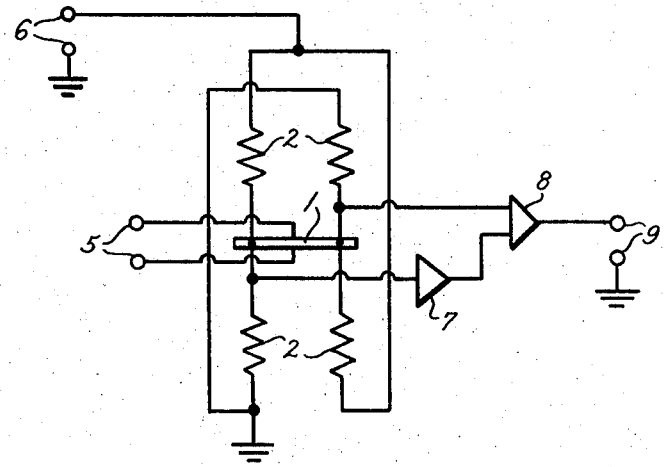
FIG. 2.
INVENTOR
Robert H. Goebel 3,471,688
PIEZOELECTRIC ANALOG MULTIPLIER
Robert H. Goebel, 11248 St. Clement,
St. Ann, Mo. 63074
Filed Feb. 11, 1965, Ser. No. 431,887
Int. Cl. G06g 7/16, 7/00; G01r 17/10
U.S. Cl. 235—194                            2 Claims

ABSTRACT OF THE DISCLOSURE

This invention relates to improvements in analog multipliers. It uses only a single piezoelectric crystal and strain gages to provide a small, wide bandwidth multiplier for use with frequencies including direct current.

---

An electrical to mechanical to electrical transduction process is employed to establish the product of two inputs. In one mechanical embodiment a bender bimorph crystal linearly converts an $x$ voltage to linear movement. The linear movement compresses two strain gages and expands two strain gages.

A $y$ voltage is applied across the strain gages which are electrically connected in a bridge. The output voltage is proportional to the product of $x$ and $y$ and is self temperature compensating.

This invention relates to improvements in analog multipliers of the type utilized to obtain the product $z$ of two known quantities $x$ and $y$ where an analog is established by generating voltages proportional to the mathematical terms of computation. Such voltages are hereinafter referred to as for instance "the $x$ voltage," etc. This type of instrument will hereinafter be referred to as an analog multiplier.

In many known analog multipliers considerable electronic equipment is employed to accomplish the process of multiplication. The $x$ voltage and the $y$ voltage proceed through the various components until the desired effect is obtained. Accurate analog multipliers of this type require many components such as transistors, resistors, capacitors, etc.

In one known type of analog multiplier an oscillatory force representing the product of the $x$ and $y$ inputs is necessary to drive a piezoelectric crystal to obtain the output $z$. Such devices use coils which are space consuming, are subject to magnetic pickup, and will only operate when at least one of the inputs is an alternating voltage. The alternating voltage limits the frequency response of the multiplier.

Generally the analog multiplier is inferior to other analog computing devices such as the feedback amplifier and potentiometer in frequency response, reliability, simplicity and accuracy.

The object of the present invention is to provide an extremely small analog multiplier different in operation than the two above stated analog multipliers and capable of providing the $z$ voltage output with either direct current or alternating current at the two inputs. This invention provides an extremely wide frequency response with the lower end of the response including direct current. This invention uses only a piezoelectric crystal and strain gages as its main elements.

According to the present invention an analog multiplier comprises means for deriving the $z$ voltage proportional to the product of the $x$ and $y$ voltages, means of generating movement proportional to the $x$ voltage by using a piezoelectric crystal, means of applying the $y$ voltage across strain gages, means for providing strain and means for monitoring the voltage $z$ appearing across the output terminals.

In the accompanying drawing: FIGURE 1 is a diagram illustrating one mechanical embodiment of the invention, FIGURE 2 is an electrical schematic illustrating one possible electrical connection of the invention.

In carrying out the invention according to one form by way of example, see FIGURE 1, an analog multiplier of the type stated comprises a piezoelectric crystal 1 and four piezoresistive strain gages 2 as its main elements. The crystal is mounted in a "C" frame 3 and the four strain gages are mounted from the free end of the crystal to the "C" frame in bridge configuration, as illustrated. At the ends of the "C" a means of applying strain to the gages is provided by utilizing a winged bolt 4. For this embodiment the electrical connections are made as shown in FIGURE 2. The $x$ voltage is applied to the terminals 5 connected across the piezoelectric crystal. The $y$ voltage is applied to the input terminals 6 connected across the four strain gages 2. The gages act as variable resistors. Linear amplifier 7 acts as an inverter and linear amplifier 8 is used as a summer to add its inputs. The $z$ voltage is monitored at the output terminals 9.

In operation an electrical to mechanical to electrical transduction process is employed to establish the product of the inputs. The piezoelectric crystal 1, being a bender bimorph, produces a movement at its free end when the $x$ voltage is applied to it. The movement perpendicular to the face of the crystal is approximately a linear function of the $x$ voltage. This movement expands two of the strain gages 2 and compresses the other two gages 2. The winged bolt 4 is used to pre-strain the gages to the center of the operating region so that both compression and expansion produce changes in this operating point. The operating point resistance is termed R and is equal in the four gages. The piezoresistive property of the gages produces a resistance change in the gages as a linear function of strain. When prestrained as described and expansion increases the resistance of a gage while compression decreases the resistance. The change in the resistance of each gage $\Delta R$ is therefore proportional to the $x$ voltage in magnitude. The polarity is determined by whether the gage is being expanded or compressed. The $y$ voltage is applied across the four gages which act as a resistive bridge. The output of the bridge is a voltage proportional to the product of the $x$ voltage and the $y$ voltage.

Mathematically the $z$ voltage may be expressed as $$z = \frac{R+\Delta R}{2R} - \frac{R-\Delta R}{2R} \cdot y$$

or $$z = \frac{\Delta R}{R} \cdot y$$

But $\Delta R$ is proportional to the $x$ voltage so that $$z = K \cdot x \cdot y$$

where K is a system constant.

In this embodiment temperature compensation is accomplished automatically if the gages have matched temperature coefficients. The current in each of the two paths within the bridge remains the same and therefore affects each gage equally. If the resistance change due to temperature $\Delta R_T$ is considered in the mathematical expression for the output voltage the following expression is obtained $$z = \frac{R+\Delta R+\Delta R_T - R+\Delta R-\Delta R_T}{2R+2\Delta R_T} y$$

or $$z = \frac{\Delta R}{R+\Delta R_T} y$$

It is noted that the resistance change due to temperature cancels out in the numerator and appears in the denominator added to the total resistance of a gage. Since the gage resistance is large with respect to the resistance change due to temperature the output is not significantly changed by temperature.

The combined compliance of the four gages should be as large as possible when compared to the compliance of the crystal so that loading of the crystal will be a minimum. The gage factor of the strain gage should also be as large as possible for a maximum output voltage. Silicon semi-conductor strain gages were selected for this embodiment of the invention to meet the above requirements.

In another embodiment of the invention two of the gages may be replaced by resistors with values equal to the resistance of the gages. The resistors need not be mounted to the crystal. The description of operation is the same as the above described device except that the gain of this analog multiplier is only half as great. Temperature compensation is sacrificed in this mechanization.

The above mentioned embodiments are for illustration only and by no means exhaust the scope of the invention. The electrical to mechanical to electrical transduction process created by employing a piezoelectric crystal and strain gages may be mechanized in many ways to create an analog multiplication. The general mechanization may be described in the following manner. A current is generated which is proportional to the $y$ voltage and a resistance change in the gage is generated by the transduction process which is proportional to the $x$ voltage. When this current is passed through the gage the change in voltage across the gage is proportional to the product of the $x$ and $y$ voltage.

I claim:

1. An analog multiplier of the type for obtaining the product $z$ of two known quantities $x$ and $y$ and operational over a wide range of frequencies, including direct current, comprised of strain gages, linear amplifiers, and one piezoelectric crystal; means for supporting the piezoelectric crystal rigidly at one end; means for mounting strain gages from the crystal's free end to a rigid fixture; means to apply the $x$ voltage to the sides of the piezoelectric crystal for generating a change in position of the crystal's free end proportional to the $x$ voltage by electrical to mechanical transduction; means for connecting the strain gages in bridge configuration to obtain a change in resistance of the strain gages proportional to the change in position when the crystal is mechanically loaded by a number of strain gages; means for applying the $y$ voltage across the input terminals of the strain gage bridge; and means for monitoring the $z$ voltage across the output terminals of the strain gage bridge as the output function of the multiplier.

2. An analog multiplier of the type for obtaining the product $z$ of two known quantities $x$ and $y$ and operational over a wide range of frequencies, including direct current, and mechanized with four silicon strain gages with equal resistive values and the same piezo-resistive properties, a piezoelectric crystal, two linear amplifiers and a C clamp for rigid support; a compact design not subject to magnetic pickup; means for supporting one end of the piezoelectric crystal in the C clamp, forming an E; with two strain gages mounted from the crystal's free end to one side of the C and the other two strain gages mounted from the crystal's free end to the other side of the C, so that the four gages are strained under static conditions; means for electrically connecting the four strain gages in a bridge configuration so that the resistance in each of the two paths is the same under static conditions, this implementation providing for self-temperature compensation; means for applying the $x$ voltage to the sides of the piezoelectric crystal causing a movement linear with respect to $x$ at the crystal's free end, the crystal being under the mechanical load of four silicon strain gages, the linear movement causing a decrease in strain on two gages while causing an increase in strain on the other two gages, providing an equal change in magnitude of resistance in each gage, two changing positive with respect to static conditions and two changing negative with respect to static conditions, the resistance in each of the two paths remaining the same as under static conditions; means for applying the $y$ voltage across the two opposite terminals of the four strain gage bridge, providing an equal current through each of the two paths of the bridge; and a summing and inverting means for monitoring the output voltage $z$, connected to obtain the difference in voltage between the remaining two terminals of the bridge.

References Cited

UNITED STATES PATENTS

| 3,300,630 | 1/1967 | Hartenstein | 235—194 |
| 3,218,445 | 11/1965 | Fluegel | 235—194 |
| 3,252,321 | 5/1966 | Pfann | 73—88.5 X |
| 3,170,320 | 2/1965 | Talmo | 73—88.5 X |

FOREIGN PATENTS 887,767  1/1962  Great Britain.

MALCOLM A. MORRISON, Primary Examiner

F. D. GRUBER, Assistant Examiner

U.S. Cl. X.R.

73—88.5; 235—179; 323—75